United States Patent [19]

Sprinkle

[11] 4,027,182

[45] May 31, 1977

[54] RATE INDEPENDENT PULSE GENERATOR

[75] Inventor: Leland W. Sprinkle, Springfield, Va.

[73] Assignee: The United States of America as represented by the Secretary of the Interior, Washington, D.C.

[22] Filed: Oct. 28, 1975

[21] Appl. No.: 625,985

[52] U.S. Cl. .................................. 310/111; 322/30; 310/155; 310/168

[51] Int. Cl.² .......................................... H02K 39/00

[58] Field of Search ................. 310/68 E, 174, 156, 310/155, 168, 111; 322/30, 31

[56] References Cited

UNITED STATES PATENTS

| | | | |
|---|---|---|---|
| 2,336,759 | 12/1943 | Stearns | 322/30 |
| 2,518,149 | 8/1950 | Kearsley | 310/155 X |
| 2,866,912 | 12/1958 | Williamson | 322/30 X |
| 3,526,796 | 9/1970 | Blitchington, Jr. et al. | 310/155 X |
| 3,566,170 | 2/1971 | Rehklan | 310/168 |
| 3,952,220 | 4/1976 | Staudt et al. | 310/168 |

FOREIGN PATENTS OR APPLICATIONS 854,492  11/1960  United Kingdom ............... 310/111

*Primary Examiner*—Donovan F. Duggan
*Attorney, Agent, or Firm*—Gersten Sadowsky; Donald R. Fraser

[57] ABSTRACT

A pulse generator having a magnet or magnetizable mass mounted within a rotating disc to move radially as a function of angular velocity and gravity. A magnetic pick-up includes a magnet to attract the movable mass when it is aligned. Another magnet may be adjustably mounted on the disc to apply an adjustable radial magnetic force on a movable magnet.

10 Claims, 6 Drawing Figures

RATE INDEPENDENT PULSE GENERATOR

BACKGROUND OF THE INVENTION

1. Field of the Invention

The present invention relates generally to pulse generators and more specifically to a pulse generator which provides sharp pulses independent of rotational velocity.

2. Description of the Prior Art

Magnetic pulse generators of the prior art generally include a permanent magnet having a pick-up coil wound around the magnet. A metallic object or another permanent magnet is rotated relative to the pick-up coil to produce pulses in the coil by intersecting the flux lines of the pick-up coil. This system works well at moderate angular velocities but has a serious drawback at very slow angular velocities. At the lower velocities, the rotating energizing means is in the field of the pick-up coil for a considerable amount of time; thus, a sharp voltage pulse cannot be produced. Therefore, a need exists for a pulse generating system which will provide a sharp pluse in the pick-up coil independent of rotational velocity.

One solution to this problem has been present by Cathcart in U.S. Pat. No. 2,685,026. By using magnetic shielding devices in the rotating magnetic coil, Cathcart limits the influence of the rotating magnet on the pick-up coil to a finite area and thus produces a sharp pulse.

Other prior art devices have attempted to accomplish the same result by using sophisticated electronics. Also, attempts have been made using a large number of mechanical elements. The use of sophisticated electronics and a large number of mechanical elements increases the cost, as well as reducing the reliability of the equipment. Thus, there exists a need in the prior art to provide an economical and highly reliable pulse generator which provides a sharp voltage pulse irrespective of rotational velocity.

SUMMARY OF THE INVENTION

The present pulse generator overcomes the problems of the prior art by providing a magnet or magnetizable material in a radial cavity of a rotating disc which moves radially within said cavity as a function of velocity, magnetism and gravity. At high angular velocity, the magnet or material is pinned to the interior of the periphery of the disc by centrifugal force and rapidly crosses a substantial portion of the flux lines of the pick-up coil in an arcuate path. By providing rotation of the disc about a horizontal axis and providing the pick-up means above the disc, gravitational forces keep the magnet or material at the bottom of the cavity in the vicinity of the pick-up means for low angular velocities. By having a permanent magnet within the pick-up coil, the magnetic attraction of the permanent magnet will draw the moving magnet or material to the periphery of the disc when the moving magnet or material of the disc is aligned with the permanent magnet of the pick-up. By causing the moving magnet to move radially or orthogonally to the movement of the moving magnet or material at high angular velocities relative to the pick-up, the moving magnet or material is within the field of the pick-up a minimum amount of time and crosses the flux lines substantially by the radial movement instead of its arcuate movement. Thus, a sharp voltage pulse is produced at low angular velocity. In one embodiment, a third magnet may be provided in the disc between the axis of rotation and the moving magnet to attract or repel a moving magnet. By providing this adjustable magnetic force, the angular velocity needed to pin the moving magnet at the periphery of the disc may be varied.

OBJECTS OF THE INVENTION

An object of the present invention is to provide a pulse generator which is capable of producing a sharp pulse independent of rotational velocity.

Another object is to provide a pulse generator with a minimum number of moving parts.

A further object of the invention is to provide an economical generator which will provide sharp voltage pulses independent of rotational velocity.

Still another object of the invention is to provide a pulse generator which will provide sharp pulses independent of rotational velocity by minimizing the time a moving magnet or magnetized material is in a pick-up's field independent of rotational velocity.

Other objects, advantages and novel features of the present invention will become apparent from the following detailed description of the invention when considered in conjunction with the accompanying drawings.

DESCRIPTION OF THE PREFERRED EMBODIMENTS

Figure 1:
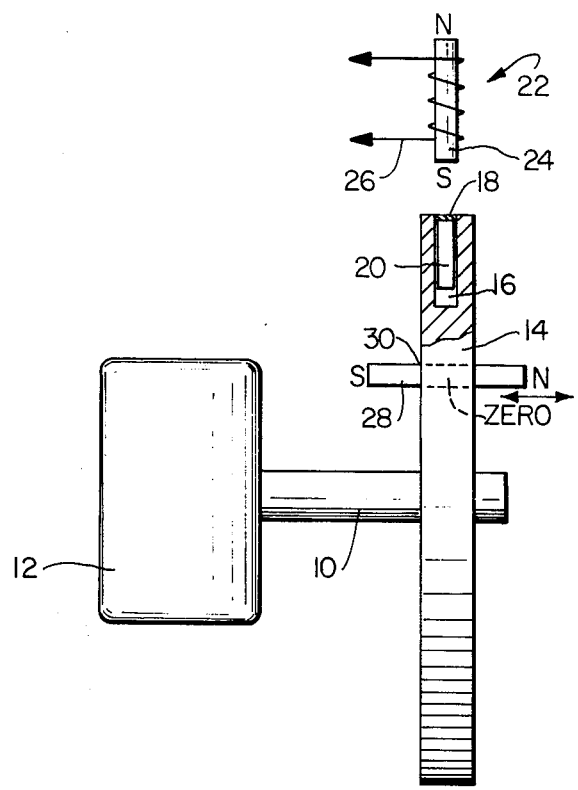
FIG. 1 is a side elevation of a preferred embodiment of the rate independent pulse generator of the present invention.

FIG. 1, which illustrates a preferred embodiment of the rate independent pulse generator, shows a shaft 10 driven by a motor 12. The motor 12 is a timing motor capable of a plurality of rotational velocities. Mounted to shaft 10 is a housing 14 having a cavity 16 therein. Housing 14, made of non-magnetic material, is a disc and may be mounted to shaft 10 by gluing, welding or any other known method. Another means of mounting would be to use fasteners.

Figure 2A:
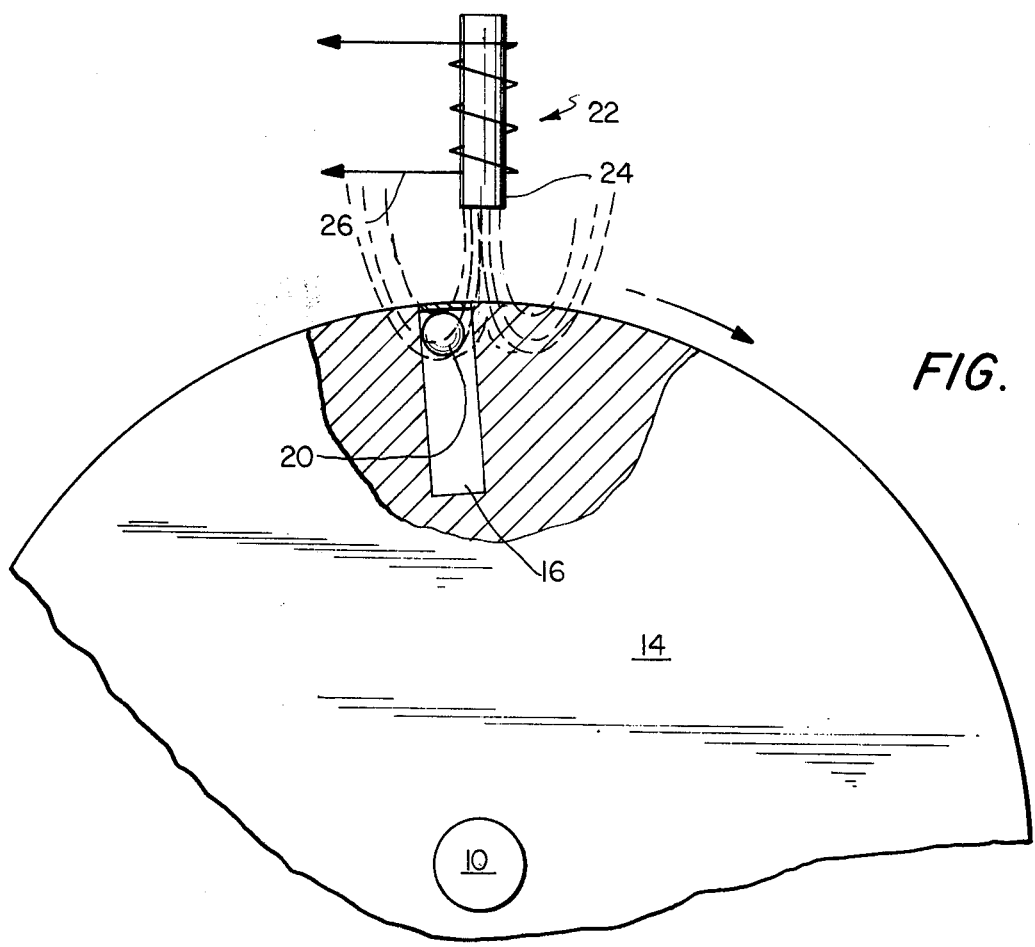
FIGS. 2A and 2B are schematic representations of a second embodiment, wherein the moving magnet material is at a plurality of positions relative to the flux lines of the pick-up coil for high angular velocities.
Figure 2B:
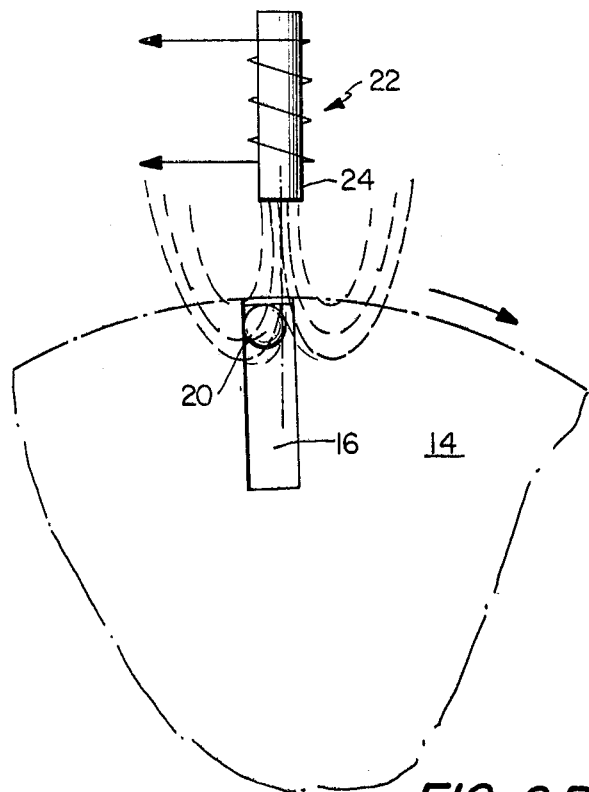
Figure 3:
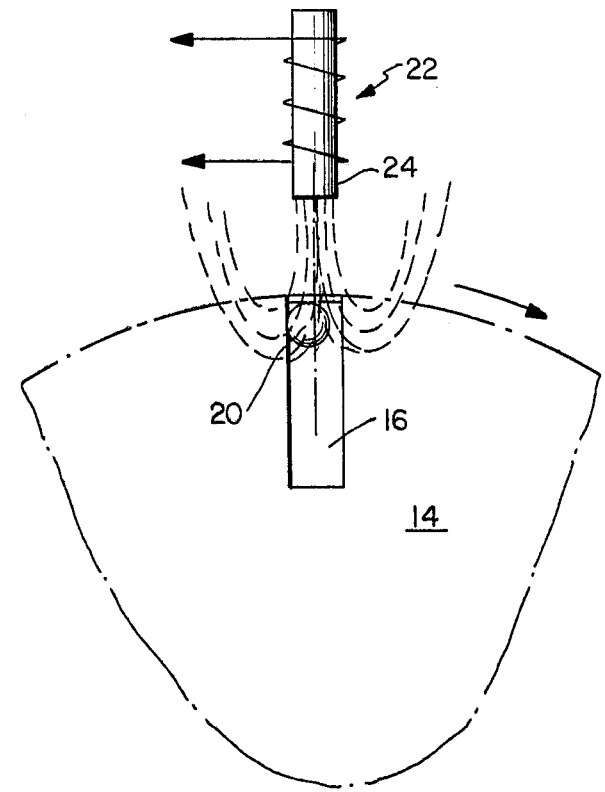
FIG. 3 is a schematic representation of the moving magnetic material relative to the flux lines of the pick-up coil when the moving magnetic material is aligned with the pick-up coil at all angular velocities.

The radial cavity 16 has been formed within the disc 14 and has an end plate 18 (which may be brass, for example) along the periphery of the disc 14. Within the cavity 16 is (illustrated in FIG. 1) a permanent cylindrical magnet bar 20 having a north and south pole so indicated. Though illustrated as a bar or cylindrical magnet, it is preferred that mangetic means 20 be a magnetizable ball, as illustrated in FIGS. 2–4 (for example, composed of half-iron and half-nickel), or any other magnetic means which will move by rolling within the radial cavities 16. It has been found that the ball configuration moves more readily within the cavity than the bar or cylindrical configuration.

Located adjacent to the periphery of disc 14 is a magnetic pick-up device 22 which includes magnet 24 and coil 26 wrapped therearound. The leads of coil 26 may be connected to appropriate electronic equipment, for example, amplifiers, which will interface the magnetic pickup 22 and the circuitry in which it is to be used. For example, the present system may be used to drive counters which could indicate r.p.m.s. or control other devices.

At high angular velocities, the centrifugal force will pin magnet 20 against end plate 18. With the magnet so located at the periphery of disc 14, sharp pulses will be produced in magnetic pick-up 22 since the magnet will enter and leave the field of pick-up device at a sufficiently high rate. As illustrated in FIGS. 2A and 2B and in FIG. 3, the movable magnetic material 20 travels an arcuate path, which is substantially planar when cutting a substantial number of flux lines of the pick-up coil 26. A large amplitude narrow width pulse is produced in the pick-up coil 26 by the direction and speed the magnetic material 20 cuts across the flux lines. FIGS. 2A and 2B depict magnetic material 20 at two angular positions approaching pick-up device 22 and FIG. 3 depicts magnetic material 20 aligned with the pick-up device 22. Since the housing 14 is rotating at high angular velocities, the magnetic material 20 is continuously pinned to end plate 18.

At lower angular velocities, the magnetic material 20 will be responsive to gravitational forces so as to be laid against plate 18 at the point the cavity 16 is at the bottom of the cycle and to lie against the bottom of cavity 16 when the cavity 16 is generally above the horizontal axis of shaft 10. As cavity 16 and magnetic material 20 approach the axis of pick-up coil 22, the permanent magnet 24 attracts magnetic material 20 so as to pull it up overcoming the forces of gravity and pin in against plate 18. This will produce a sharp voltage pulse since the distance between magnetic material 20 and the pick-up coil 22 is not sufficiently close until the magnetic material 20 is aligned with the axis of pick-up means 22.

Figure 4A:
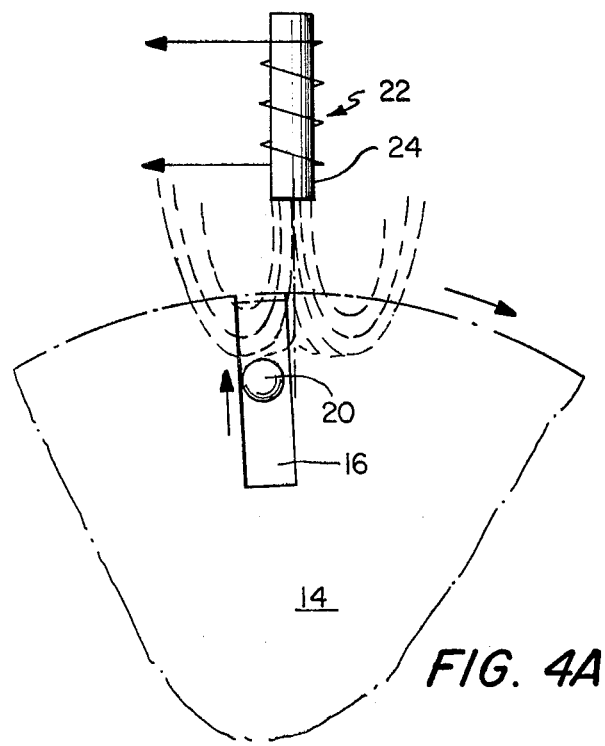
FIGS. 4A and 4B are schematic representations of the location of the moving magnetic material at a plurality of positions relative to the flux lines of the pick-up coil for low angular velocities.
Figure 4B:
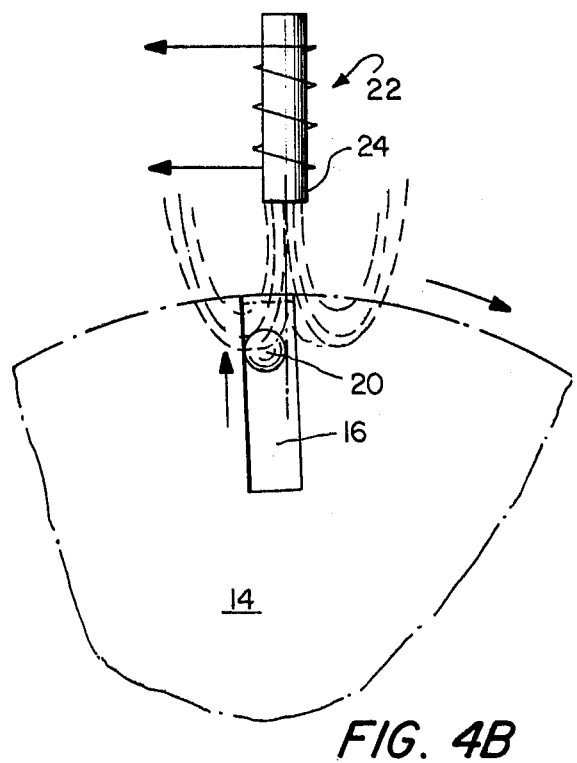

As illustrated in detail in FIGS. 4A and 4B, a ball 20 starts to move towards the pick-up coil at angles very close to the axis of the pick-up coil and is not at plate 18 until directly aligned as shown in FIG. 3. Also illustrated is the path of the ball 20 relative to the flux lines of the pick-up coil 26. The major direction of movement of ball 20 is radial relative to the housing 14 so as to cross the flux lines orthogonally to the direction of the ball 20 at higher angular velocities. At some angular velocities, the radial movement is at a greater velocity than the angular velocity. The radial movement minimizes the amount of time ball 20 is in the field of pick-up coil 22 and causes the ball 20 to cross fewer flux lines at a more concentrated area. Since the ball 20 moves slower through the flux lines and at acute angles, the shape pulse is at a smaller amplitude. The reduction of magnetic attraction produced by magnet, 24, as compared to the forces of gravity, provides a descent of the ball 20 within chamber 16 equal to the ascent shown in FIGS. 4A and 4B. Thus, at very low angular velocities, sharp voltage pulses are produced in pick-up coil 26 by using the forces of gravity to maintain a large air gap between the ball 20 and the coil 26 until the rotating ball 20 is substantially aligned with magnet 24 of the pick-up device and to cause the ball 20 to move radially in a minimum amount of time through the flux lines of the coil 26.

It should be noted that the physical relationship between the pick-up means 22 and housing 14 has been exaggerated to allow proper illustration of the flux lines and the movement of ball 20 relative thereto.

A means is provided as shown in FIG. 1 to adjust the angular velocity at which cylindrical permanent magnet 20 will be pinned against plate 18. This includes a magnet 28 received in a slot 30 in disc 14 between magnet 20 and shaft 10. Appropriate fasteners may be provided to lock the position of magnet 28 relative to the plane of disc 14. In lieu of specific fasteners, the magnet 28 and/or the slot 30 may be provided with material of a high coefficient of friction so as to prevent movement other than by large manual force. By maintaining magnet 28 centered on the plane of housing 14, there is no magnetic force applied to magnet 20. By moving magnet 28 to the right as shown in FIG. 1, a repulsive force is provided by the south pole of magnet 28 on the south pole of magnet 20 so as to produce a radial force biasing magnet 20 towards the periphery of the disc. This will reduce the centrifugal force needed to pin the magnet 20 against plate 18. Similarly, by moving the magnet 28 to the left as shown in FIG. 1, the north pole will provide an attracting force on the south pole of magnet 20 so as to provide a radial magnetic force on magnet 20 which would increase the centrifugal force needed to pin the magnet 20 against the plate 18.

The attraction of magnet 28 should not be so great as to totally destroy the attraction of magnet 24 of the pick-up coil. By providing an attraction force between magnets 28 and 20, a stronger pulse at smaller angular velocities may be produced since the magnet 20 will be kept at the bottom of cavity 16 until it is closer to direct alignment with magnet 24. This will also cause magnet 20 to move at a greater radial velocity which will produce a stronger pulse. Similary, the attractive force of magnet 28 will cause a quicker reset so as to diminish the carry-over produced by magnet 20 as it rotates away from the axis of magnet 24.

Of course, it can be seen that the present rate independent pulse generator can provide a strong pulse for rotational velocities in the range of one revolution in 10 years to a thousand revolutions per second.

From the preceding description of the present preferred embodiments, it is obvious that the objects of the present invention are attained. Although the invention has been described and illustrated in detail, it is to be clearly understood that the same is by way of illustration and example only and is not to be taken by way of limitation. The materials used in the disc may be plastic or any other well known non-magnetic housing, including non-magnetic metals. The biasing means provided by magnet 28 may be any other biasing means which is adjustable to provide a radial adjustable force on magnet 20. Similarly, other pick-ups may be used besides pick-up 22, which may include a magnet 24. Although the magnets have been illustrated as permanent or magnetizable magnets, moving magnetic means 20 may be of any magnetizable material and any or all of the magnets may be electromagnets, though this may greatly increase the cost and complexity of the present pulse generator.

What is claimed:

1. A pulse generator comprising a shaft, a motor means connected to said shaft to rotate said shaft at a plurality of rotational velocities, housing means mounted to said shaft to rotate in a plane perpendicular to the longitudinal axis of said shaft, a first magnetic means disposed unattached in said housing means and movably connected by contact therein so as to move radially relative to said shaft as a function of rotational velocity, and pick-up means mounted adjacent the arcuate path of said housing means to detect the presence of said magnetic means and produce a pulse, wherein said pick-up means includes a coil and a further magnetic means to attract said first magnetic means when it is aligned with said pick-up means.

2. The pulse generator of claim 1 wherein said housing means is a disc having a radial cavity adjacent the periphery of said disc and said first magnetic means moves in said cavity as a function of rotational velocity.

3. The pulse generator of claim 1 wherein said housing means is a disc and wherein said mounting means is a radial cavity in said disc receiving said first magnetic means and allowing radial movement of said first magnetic means.

4. A pulse generator comprising a shaft, a motor means connected to said shaft to rotate said shaft at a plurality of rotational velocities, housing means mounted to said shaft to rotate in a plane perpendicular to the longitudinal axis of said shaft, a first magnetic means movably connected to said housing means to move radially relative to said shaft as a function of rotational velocity, a second magnetic means mounted in said housing between said first magnetic means and said shaft for biasing said first magnetic means radially, and pick-up means mounted adjacent the arcuate housing means to detect the presence of said first magnetic means and produce a pulse, wherein said pick-up means includes a coil and a third magnetic means to attract said first magnetic means when said first magnetic means is aligned with said pick-up means.

5. A pulse generator of claim 1 wherein said shaft rotates about a horizontal axis and said pick-up means is above said housing means so that said first magnetic means has a movement which is also a function of gravity.

6. A pulse generator comprising a shaft, motor means connected to said shaft to rotate said shaft at a plurality of rotational velocities, housing means mounted to said shaft to rotate in a plane perpendicular to the longitudinal axis of said shaft, first magnetic means movably connected to said housing means to move radially relative to said shaft as a function of rotational velocity, a biasing means for providing a radial force on said first magnetic means, and pick-up means mounted adjacent the arcuate path of said housing means to detect the presence of said magnetic means and produce a pulse.

7. The pulse generator of claim 6 wherein said biasing means is a second magnetic means mounted to said housing means between said first magnetic means and said shaft to attract said first magnetic means toward said shaft.

8. The pulse generator of claim 6 wherein said second magnetic means is adjustably mounted to said housing means to vary said attraction.

9. A pulse generator for producing sharp pulses independent of rotational velocity comprising a housing means, drive means connected to said housing for rotating said housing about a first axis at a plurality of angular velocities, first magnetic means, mounting means for movably connecting said first magnetic means to said housing in a position which differs as a function of angular velocity of said housing, a second magnetic means mounted to said housing means for producing a magnetic force on said first magnetic means so that said different positions are also a function of said force of said second magnetic means, and pick-up means positioned adjacent the angular path of said housing to detect the presence of said first magnetic means and produce a pulse.

10. A pulse generator for producing sharp pulses independent of rotational velocity comprising a housing means, drive means connected to said housing for rotating said housing about a first axis at a plurality of angular velocities, first magnetic means, mounting means for movably connecting said first magnetic means to said housing in a position which differs as a function of angular velocity of said housing, and pick-up means positioned adjacent the angular path of said housing to detect the presence of said first magnetic means and produce a pulse, wherein said pick-up means includes a coil and said mounting means connects said first magnetic means to said housing moving at high angular velocities where said first magentic means is disposed to cut through the flux lines of said coil in substantially a first direction, and said housing moving at lower angular velocities where said first magnetic means is further disposed to cut through the flux lines of said coil in substantially a second direction which is substantially orthogonally situated with respect to said first direction.

* * * * *